March 19, 1968  E. A. JORDAN  3,373,620
BRAKE ACTUATING MECHANISM
Filed March 8, 1966  2 Sheets-Sheet 1

Edgar A. Jordan
INVENTOR.

BY *Clarence A. O'Brien*
and *Harvey B. Jacobson*
Attorneys

March 19, 1968  E. A. JORDAN  3,373,620
BRAKE ACTUATING MECHANISM
Filed March 2, 1966  2 Sheets-Sheet 2
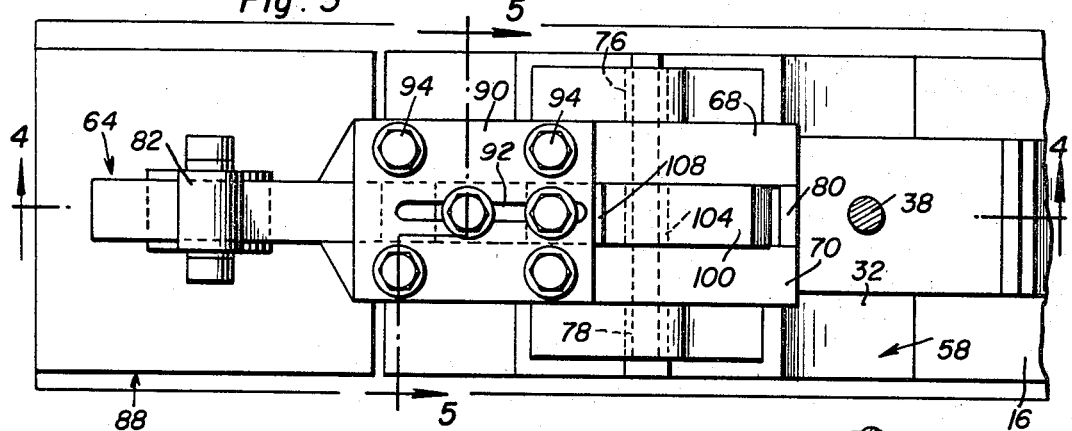
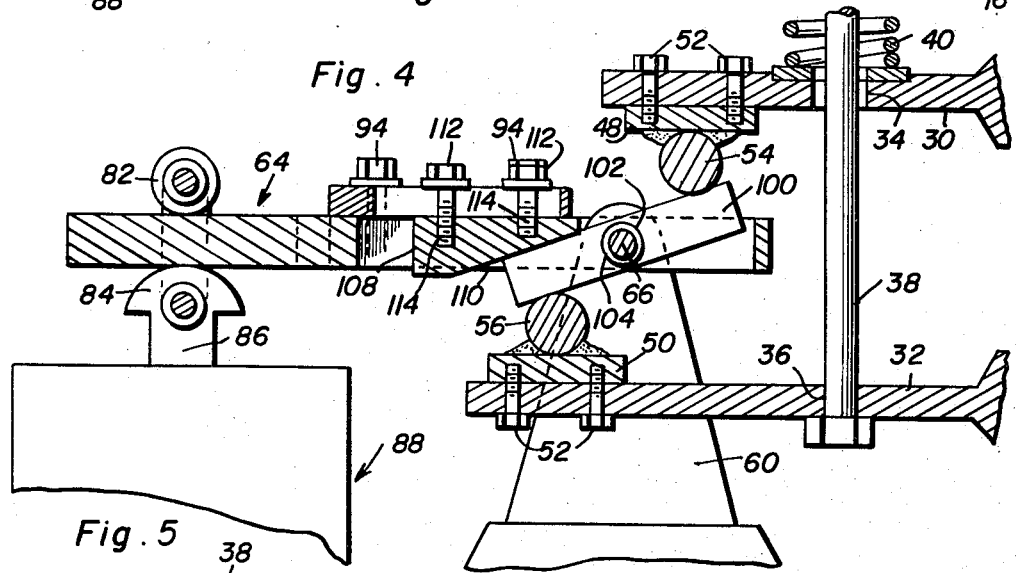
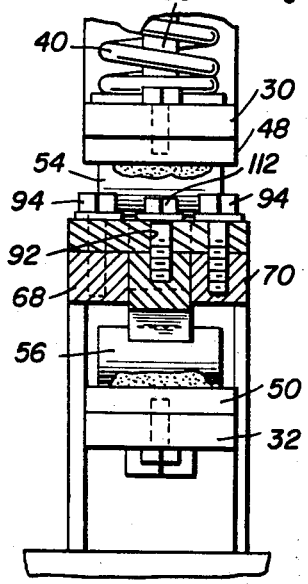
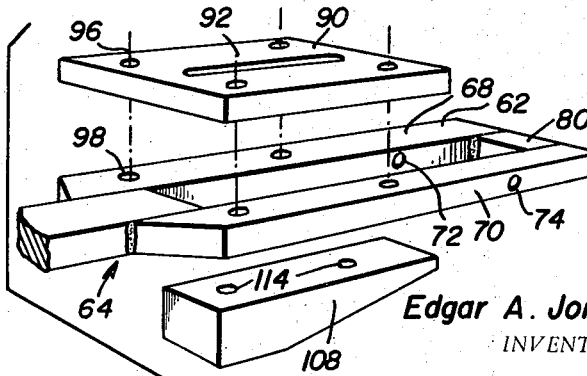
Edgar A. Jordan
INVENTOR.

United States Patent Office 3,373,620
Patented Mar. 19, 1968

3,373,620
BRAKE ACTUATING MECHANISM
Edgar A. Jordan, 2510½ Gettle St.,
Klamath Falls, Oreg. 97601
Filed Mar. 8, 1966, Ser. No. 532,776
8 Claims. (Cl. 74—96)

This invention relates to a novel and useful motion transmitting assembly and more specifically to an assembly adapted to apply force in generally opposite directions on a pair of members disposed in spaced apart relation and mounted for movement toward and away from each other.

Although the motion transmitting assembly of the instant invention is specifically illustrated and described hereinafter as being an actuator for a brake assembly, it is to be noted that the motion transmitting assembly could also be readily utilized in other environments to advantage if similar operating characteristics are desirable.

The main object of this invention is to provide a brake actuating mechanism for a brake assembly including an expandable partial cylindrical brake band.

Another object of this invention is to provide a brake actuating mechanism in accordance with the preceding object which may be readily adjusted so as to compensate for wear occurring at the friction braking surfaces of the aforementioned band.

Still another object of this invention, in accordance with the immediately preceding object, is to provide means whereby a single adjustment of the brake actuating mechanism is all that is required when it becomes necessary to adjust the actuating mechanism to compensate for wear of the aforementioned friction braking surfaces.

Still another object of this invention is to provide a brake actuating mechanism in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a fragmentary enlarged horizontal sectional view taken substantially upon the plane indicated by the section line 3—3 of FIGURE 2;

FIGURE 4 is a fragmentary vertical sectional view taken substantially upon the plane indicated by the section line 4—4 of FIGURE 3;

FIGURE 5 is a fragmentary vertical sectional view taken substantially upon the plane indicated by the section line 5—5 of FIGURE 3;

FIGURE 6 is a fragmentary exploded perspective view of one end portion of the lever arm portion of the actuating mechanism.

Figure 1:
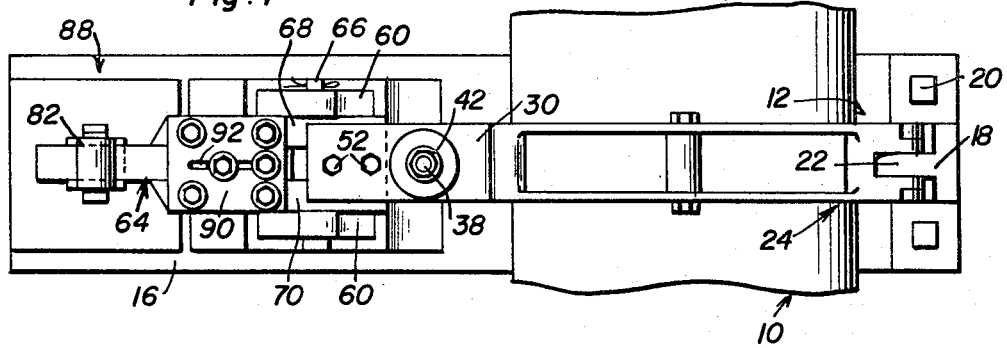
FIGURE 1 is a top plan view of a brake assembly and a rotatable shaft with which the assembly is operatively associated and with the brake actuating mechanism of the instant invention operatively associated with the brake assembly.
Figure 2:
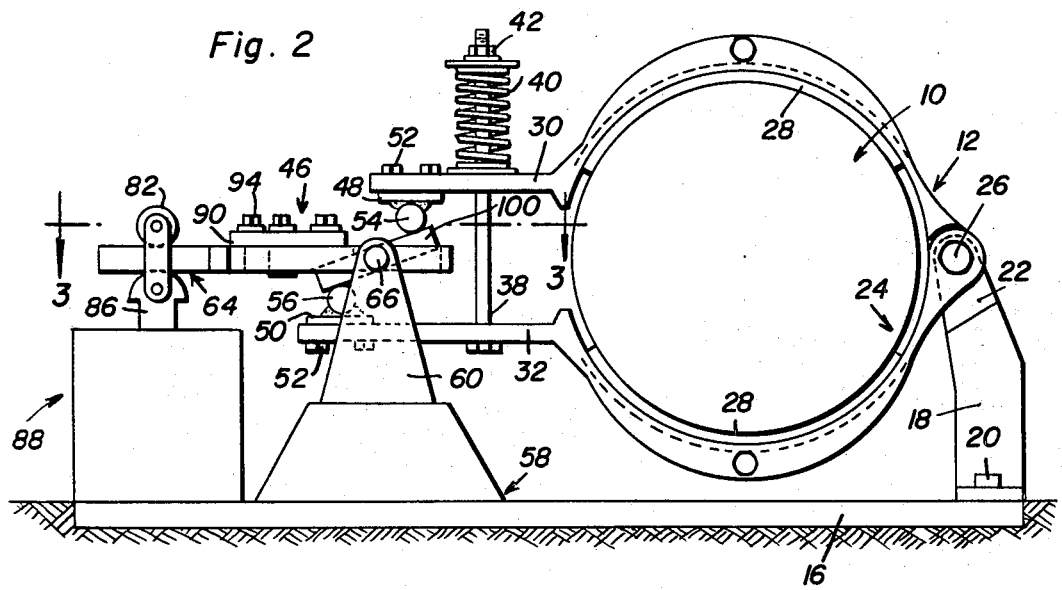
FIGURE 2 is a side elevational view of the assemblage illustrated in FIGURE 1.
Figure 7:
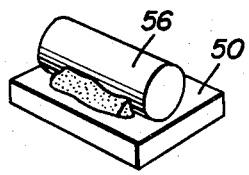
FIGURE 7 is a perspective view of one of the abutment blocks carried by the free ends of the actuating arm members of the brake mechanism adapted to be engaged by the brake actuating mechanism during its operation.

Referring now more specifically to the drawings, the numeral 10 generally designates a rotatable shaft and the numeral 12 generally designates a shaft braking mechanism operatively associated with the shaft 10.

The shaft braking mechanism 12 includes a base 16 suitably anchored in fixed position relative to the axis of rotation of the shaft 10 and a standard 18 which is supported from the base 16 by means of suitable fasteners 20 and includes an apertured upper end portion 22 from which an expandable and contractable partial cylindrical brake band assembly generally referred to by the reference numeral 24 is pivotally supported by means of a pivot fastener 26.

The brake band assembly 24 includes friction lining members 28 and the free ends of the brake band assembly 24 are provided with generally parallel outwardly projecting operating arm members 30 and 32 which may be urged toward and away from each other to cause the brake lining members 28 to be moved into and out of braking frictional engagement with the rotatable shaft 10. Further, the arm members 30 and 32 are provided with suitable aligned apertures 34 and 36, repsectively, and a fastener 38 is secured through the apertures 34 and 36 with a compression spring 40 disposed about the free end portion of the fastener 38 projecting through the aperture 34 and between a threaded abutment member 42 threadedly engaged with the fastener 38 and the surface of the arm member 30 remote from the arm member 32. In this manner, the compression spring 40 may be utilized to yieldingly urge the arm members 30 and 32 together and to thereby apply a predetermined braking force on the rotatable shaft 10, which braking force may be adjusted by adjusting the abutment member 42 along the fastener 38.

The brake actuating mechanism of the instant invention is generally referred to by the reference numeral 46 and includes a pair of abutment blocks 48 and 50 secured to the free ends of the arm members 30 and 32 by means of fasteners 52 and including generally cylindrical abutment elements 54 and 56 which generally parallel each other and extend transversely of the arm members 30 and 32.

In addition, the brake actuating mechanism 46 includes a support base generally referred to by the reference numeral 58 including a pair of furcations 60 between which the bifurcated end 62 of a lever arm generally referred to by the reference numeral 64 is pivotally supported by means of a pivot fastener 66. The bifurcated end 62 includes a pair of generally parallel furcations 68 and 70 through which a pair of bores 72 and 74, respectively, are formed and the opposite end portions of the pivot fastener 66 are secured in the bores 72 and 74 and journaled in sleeves 76 and 78 secured in the furcations 60. Further, the free ends of the furcations 68 and 70 are rigidly interconnected by means of a transverse brace member 80 and the free end of the lever arm 64 is received between roller and stationary abutments 82 and 84 carried by the armature 86 of an electric solenoid generally referred to by the reference numeral 88 and rigidly secured to the base 16 in any convenient manner.

A mounting plate 90 is secured to and extends between the base ends of the furcations 68 and 70. The mounting plate 90 includes a slot 92 which is registered with the slot defined between the furcations 68 and 70 and plate 90 is secured to the furcations 68 and 70 by means of suitable fasteners 94 passed through suitable bores 96 formed in the plate 90 and threadedly engaged in threaded bores 98 formed in the furcations 68 and 70.

An elongated abutment member 100 is provided and has a bore 102 formed therethrough in which a sleeve 104 is secured and the abutment member 100 is disposed between the furcations 68 and 70 with the pivot fastener 66 extending through the sleeve 104 thereby pivotally supporting the abutment member 100 for oscillation independently of the lever arm 64.

From FIGURE 4 of the drawings it will be noted that the lever arm 64 is substantially horizontally disposed and that the abutment member 100 is inclined slightly relative to the longitudinal axis of the lever arm 64 and includes opposite end portions which are engaged with the cylindrical abutment elements 54 and 56.

An abutment member or block 108 including an inclined surface 110 is adjustably secured on the plate 90 by means of suitable threaded fasteners 112 secured through the slot 92 and threadedly engaged in suitable threaded bores 114 formed in the abutment block 108. Accordingly, the abutment block 108 may be adjusted longitudinally of the slot 92 and it will be noted that the inclined surface 110 is disposed in engagement with one end portion of the abutment member 100.

In operation, the compression spring 40 normally urges the arm members 30 and 32 toward each other thereby causing the brake band assembly 24 to brake the shaft 10. However, the armature 86 of the solenoid 88 is normally in the extended position and may be retracted by actuating the solenoid 88 whereupon a downward force is applied to the free end of the lever arm 64. Inasmuch as the arm member 100 is engaged with the abutment block 108 the abutment member 100 may not pivot in a clockwise direction relative to the lever arm 64 and accordingly, counterclockwise pivotal movement of the lever arm 64 caused by actuation of the solenoid 88 will effect counterclockwise rotation of the abutment member 100. Such counterclockwise rotation of the abutment member 100 from the position illustrated in FIGURE 4 of the drawings will of course force the abutment elements 54 and 56 away from a horizontal plane containing the pivot fastener 66 and thus move the free ends of the arm members 30 and 32 away from each other whereby the brake band assembly 24 will release its braking action on the shaft 10. Of course, as the friction braking surfaces of the brake band assembly 24 wear, the abutment block 108 may be shifted to the left as viewed in FIGURE 4 of the drawings relative to the lever arm 64 thereby enabling the brake band assembly 24 to be fully applied when the lever arm 64 is in the horizontal position illustrated in FIGURE 4 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motion transmitting assembly adapted to apply force in generally opposite directions on a pair of members disposed in spaced apart relation, said assembly comprising a lever arm pivotally supported at one end for oscillatory movement about a first axis through a plane adapted to generally parallel said opposite directions, an elongated abutment member pivotally supported intermediate its opposite ends for movement about a second axis generally paralleling said first axis and extending transversely of said abutment member, and abutment means carried by said lever and operable to adjustably limit pivotal movement of said abutment member in one direction, said abutment member including opposite end portions thereof disposed on opposite sides of a plane disposed normal to the longitudinal centerline of said lever arm adapted to engage said pair of members to urge the latter apart upon pivotal movement of said lever arm in a direction causing rotation of said abutment member in a direction opposite to said one direction.

2. The combination of claim 1 wherein the axis of rotation of said lever arm and said elongated abutment member coincide.

3. The combination of claim 1 wherein said abutment member is adjustable longitudinally of said lever arm.

4. The combination of claim 1 wherein a line extending through said opposite end portions of said elongated abutment member is angularly rotated relative to the longitudinal center axis of said lever arm about an axis generally paralleling said first axis.

5. The combination of claim 1 including a brake assembly having a pair of spaced apart brake actuating members movable relative toward and away from each other and yieldingly urged together, said actuating members being disposed in the first mentioned plane and for engagement by said opposite end portions.

6. The combination of claim 5 wherein said abutment member is adjustable longitudinally of said lever arm.

7. The combination of claim 6 wherein the axis of rotation of said lever arm and said elongated abutment member coincide.

8. The combination of claim 7 wherein a line extending through said opposite end portions of said elongated abutment member is angularly rotated relative to the longitudinal center axis of said lever arm about an axis generally paralleling said first axis.

References Cited
UNITED STATES PATENTS

| | | | |
|---|---|---|---|
| 853,585 | 5/1907 | Hunt | 188—171 |
| 2,558,594 | 6/1951 | Tritle | 188—171 |
| 3,235,698 | 2/1966 | Turgeon | 200—170 |
| 2,710,543 | 6/1955 | Krogh et al. | 74—96 |

FRED C. MATTERN, JR., *Primary Examiner.*

W. S. RATLIFF, *Assistant Examiner.*